United States Patent
Hobbs et al.

(10) Patent No.: US 12,210,664 B2
(45) Date of Patent: Jan. 28, 2025

(54) INTRUSION DETECTION FOR AN INFORMATION HANDLING SYSTEM

(71) Applicant: Dell Products L.P., Round Rock, TX (US)

(72) Inventors: Derric Christopher Hobbs, Round Rock, TX (US); Eric Neil Sendelbach, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 683 days.

(21) Appl. No.: 17/454,417

(22) Filed: Nov. 10, 2021

(65) Prior Publication Data

US 2023/0140967 A1 May 11, 2023

(51) Int. Cl.
*G06F 21/00* (2013.01)
*G06F 21/55* (2013.01)
*G06F 21/86* (2013.01)

(52) U.S. Cl.
CPC .............. *G06F 21/86* (2013.01); *G06F 21/55* (2013.01); *G06F 2221/034* (2013.01)

(58) Field of Classification Search
CPC ..... G06F 2221/034; G06F 21/55; G06F 21/86

USPC .......................................................... 726/23
See application file for complete search history.

(56) References Cited

U.S. PATENT DOCUMENTS

| 9,906,360 B2* | 2/2018 | Johnson | H04L 9/0631 |
| 11,797,994 B2* | 10/2023 | Muchsel | G07F 7/0873 |
| 2015/0220457 A1* | 8/2015 | Katoh | G11C 13/0069 |
| | | | 713/193 |

\* cited by examiner

*Primary Examiner* — Josnel Jeudy
(74) *Attorney, Agent, or Firm* — Norton Rose Fulbright US LLP

(57) ABSTRACT

An intrusion detection circuit may use an element that produces non-repeatable values of a characteristic of the non-repeating element in order to prevent system manipulation. An information handling system may determine a first value for a first characteristic of the non-repeating element coupled to a secure boundary of the information handling system to activate the non-repeating element when the secure boundary is breached; retrieve a second value for the first characteristic of the non-repeating element, where the second value is a previous value compared to the first value; and determine whether an intrusion event occurred by comparing the first value of the first characteristic of the non-repeating element with the second value of the first characteristic of the non-repeating element.

17 Claims, 9 Drawing Sheets

INTRUSION DETECTION FOR AN INFORMATION HANDLING SYSTEM

FIELD OF THE DISCLOSURE

The instant disclosure relates to an intrusion detection system for an information handling system. More specifically, portions of this disclosure relate to an intrusion detection system without active power such as a complementary metal-oxide-semiconductor (CMOS) battery.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may have an intrusion detection system to determine when a secure boundary has been breached, such as by the unauthorized removal of a cover from a chassis of the information handling system. Removing the cover may provide malicious actors access to components in the system and possibly avoid security measures in place in the system. For example, a malicious user may remove the cover to obtain direct access to a storage device and circumvent access control to the storage device.

A conventional intrusion detector may monitor the breaking of a conductive connection when a cover is removed. The intrusion events such as the breaking of the conductive connection may be recorded in non-volatile memory for analysis and/or reporting. Detection of the intrusion requires power to detect the break in the conductive connection and thus requires active power such as a CMOS battery. The CMOS battery may lose charge over time, and even before the system is placed into service. Replacing CMOS battery is cumbersome to a user, and intrusions made while the CMOS battery has failed will not be detected.

Shortcomings mentioned here are only representative and are included to highlight problems that the inventors have identified with respect to intrusion detection systems in information handling systems (IHSs) and sought to improve upon. Aspects of the IHS with one or more features described below may address some or all of the shortcomings as well as others known in the art.

SUMMARY

An intrusion detection system may include a non-repeating element. The non-repeating element may produce non-repeatable values of a characteristic. The non-repeating values reduce the ability to tamper with the information handling system by entering the system and manipulating the intrusion detection system by setting known values for one or more elements of the intrusion detection center. For example, a non-repeating resistive element may produce a new value for a resistance characteristic that is unlikely (e.g., with a probability below a certain threshold) or impossible (e.g., probability of zero) to be a repeat of an immediately previous value and/or that is unpredictable having knowledge of only the previous value. Because each subsequent value of the characteristic triggered by intrusion into the system is non-repeating, a malicious user is less likely to be able to manipulate the intrusion detection system by manipulating the non-repeating element. In some embodiments, the non-repeating element may be an electro-mechanical switch that may include a variable resistive element, a rotating wiper, a plunger, and/or a spring. The plunger may rotate the rotating wiper to a new location on the resistive element resulting in a new value for the resistance characteristic. The amount of rotation of the plunger may be proportional to a force applied to the plunger. The nature of the removal of a part of a chassis may result in unpredictable and/or different amounts of force applied to the plunger, resulting in different and unpredictable new values for the resistance characteristic. Other non-repeating elements that produce a new value for comparison with a previous value may be implemented in an intrusion detection circuit as well. For example, the non-repeating element may include a series of fuses that are activated each time an intrusion occurs, with the fuses altering a characteristic of the non-repeating element in a manner that the characteristic cannot be returned to a previous value. Other examples of non-repeating elements may be used for intrusion detection, such as other embodiments described herein.

A history of values for the characteristic may be recorded, such as at least the previous value. The new value of the characteristic may be determined and compared to the history (e.g., the previous value) to determine when a secure boundary, such as a chassis or cover of the information handling system, has been breached. One benefit of some embodiments of the non-repeating element, such as with an electro-mechanical switch, is the possibility of operating without active power. This may allow the intrusion detection to operate when the CMOS battery is discharged, which increases the security of the information handling system. This may alternatively allow the removal of the CMOS battery from the system, which reduces from the initial build cost and long-term maintenance cost of the information handling system. The non-repeating element in the intrusion detection system may thus provide an improved intrusion detection system in some embodiments of the disclosure.

Although intrusion relating to a chassis of an information handling system is described, the intrusion detection may be applied to any secure boundary, whether in an information handling system or outside an information handling system. For example, a secure boundary may be established in a space within the information handling system around a secure processor or secure memory, and the intrusion detection techniques and/or systems herein applied to detect intrusion into that secure boundary. As another example, a secure boundary may be established around, for example, a locking mechanism and the intrusion detection techniques and/or systems herein applied to detect intrusion into that secure boundary to detect tampering with the locking mechanism.

According to one embodiment, a method may include determining, by an information handling system, a first value for a first characteristic (e.g., resistance, voltage level, capacitance, inductance, current level, etc.) of an non-repeating element coupled to a secure boundary of the information handling system such that the non-repeating element is cycled to a new non-repeating value when the secure boundary is breached; determining, by the information handling system, (e.g., by retrieving from a non-volatile memory) a second value for the first characteristic of a non-repeating element, wherein the second value corresponds to a previous time than the first value; and determining, by the information handling system, an intrusion event occurred by comparing the first value of the first characteristic of the non-repeating element with the second value of the first characteristic of the non-repeating element.

In some embodiments, the step of determining the first value of the first characteristic of the non-repeating element may include determining the first value of the first characteristics of an electro-mechanical switch. In another embodiment, the step of determining the first value of the first characteristic of the electro-mechanical switch may include determining a position of a rotating wiper relative to a variable resistive element, wherein the position of the rotating wiper may be rotated by an amount proportional to a force applied to a contact point of the secure boundary. In certain embodiments, the step of determining the first value of the first characteristic of the non-repeating element may include determining the first value of the first characteristics of the non-binary element. In another embodiment, the step of determining the first value of the first characteristic of the non-repeating element may include reading a current value from a general purpose input/output port of the non-repeating element. In some embodiments, the step of determining the first value for the first characteristic of the non-repeating element coupled to the secure boundary of the information handling system to activate the limit of the non-repeating element when the secure boundary is breached may include determining the first value for the first characteristic of the non-repeating element coupled to a cover of the information handling system.

In certain embodiments, the step of determining the intrusion event occurred by comparing the first value of the first characteristic of the non-repeating element with the second value of the first characteristic of the non-repeating element indicating that the limit was activated may include determining the intrusion event occurred when there is no power supplied to the non-repeating element.

In some embodiments, the method may further include a step for determining, by a basic input/output system, the first value for the first characteristic of the non-repeating element coupled to the secure boundary of the information handling system to activate the limit of the non-repeating element when the secure boundary is breached; retrieving, by the basic input/output system, the second value for the first characteristic of the non-repeating element, wherein the second value is the previous value compared to the first value; and determining, by the basic input/output system, the intrusion event occurred by comparing the first value of the first characteristic of the non-repeating element with the second value of the first characteristic of the non-repeating element indicating that the limit was activated.

In another embodiment, the method may be embedded in a computer readable medium as computer program code including instructions that cause the processor coupled to a memory to perform operations corresponding to the steps of the method.

In certain embodiments, the method may be implemented in an information handling system (IHS). The information handling system may include a chassis comprising at least one removable component (e.g., a side or panel) forming a secure boundary, a non-repeating element configured to cycle to a new non-repeating value of a first characteristic when the secure boundary is breached; a memory within the chassis; and a processor within the chassis and coupled to memory. The processor may be configured to perform the method of intrusion detection described according to different embodiments herein. In some embodiments, the step of determining the first value of the first characteristic of the non-repeating element may include determining the first value of the first characteristics of an electro-mechanical switch. In another embodiment, the step of determining the first value of the first characteristic of the electro-mechanical switch may include determining a position of a rotating wiper relative to a variable resistance element, wherein the position of the rotating wiper may be rotated by an amount proportional to a force applied to a contact point of the secure boundary. In certain embodiments, the electro-mechanical switch may further include a housing, a contact terminal for a general purpose input/output, a spring, a plunger, and a cover, wherein the plunger may include the contact point for the secure boundary and the cover may include the secure boundary.

In another embodiment, an electro-mechanical switch may include a housing, wherein the housing may include an alignment pin, a contact terminal for a general purpose input/output, an opening, wherein the opening may be configured to receive a plunger and a spring and wherein the alignment pin may extend away from the housing; the plunger coupled to the spring, wherein a distal end of the plunger may be coupled to a proximal end of the spring and wherein the plunger and the spring may define a contact point for a secure boundary, wherein the secure boundary may be a cover for an information handling system; a non-repeating element, wherein the non-repeating element may be enclosed in the housing and coupled to the contact terminal for the general purpose input/output; a rotating wiper, wherein the rotating wiper may be enclosed in the housing and coupled to the non-repeating element; and a cover for the electro-mechanical switch, wherein the cover may seal a top of the housing.

In certain embodiments, the non-repeating element of the electro-mechanical switch may include a variable resistive element, wherein the variable resistive element may include a metallic material, wherein the metallic material may be shaped as a semi-circle. In another embodiment, the rotating wiper of the electro-mechanical switch may be rotated by an amount proportional to a force applied to the contact point of the secure boundary.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. For example, the non-repeating element and/or intrusion detection circuit may be implemented in any of the embodiments of the disclosure. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed method, information handling system, and electro-mechanical switch, reference is now made to the following descriptions taken in conjunction with the accompanying drawings.

DETAILED DESCRIPTION

An intrusion detection system with a non-repeating element may provide intrusion detection functionality with reduced likelihood of manipulation by a malicious user, better intrusion detection, and/or detection of events when there is no active power. The non-repeating element may provide mechanical detection and/or electrical detection using analog and/or digital values, such as by reading an analog value from an electro-mechanical switch. In some embodiments, the non-repeating resistive element may produce a new value for comparison with a previous value, in which the system may detect a mismatch between the new value and the previous value to determine the occurrence of an intrusion event. For example, when a secure boundary of the IHS is removed, the non-repeating resistive element, alone or in combination with another element, may indicate that the secure boundary has been removed.

A general purpose input/output (GPIO) pin may be used to determine the value of the non-repeating element. For example, when the non-repeating element is a resistive element and is coupled to a processor (e.g., a CPU or EC) through the GPIO, the processor may record a value of a characteristic of the non-repeating element for storage in non-volatile memory (NVM) for comparison. A future determination of the characteristic of the non-repeating element may be compared with the previous value stored in NVM to determine whether the intrusion event has occurred. Measuring the non-repeating value of the characteristic of the non-repeating element in the intrusion detection circuit may reduce the likelihood of system manipulation. For example, the use of a non-binary element in the intrusion detection circuit may increase the difficulty for a malicious user to manipulate the non-repeating element in order to hide a breach of the secure boundary. With the non-repeating element, the previous value and the new value of the characteristic of the non-repeating element may be determined and recorded as an analog or digital signal by the IHS. The values may be used to determine when a secure boundary such as a chassis or cover has been breached.

Figure 1:
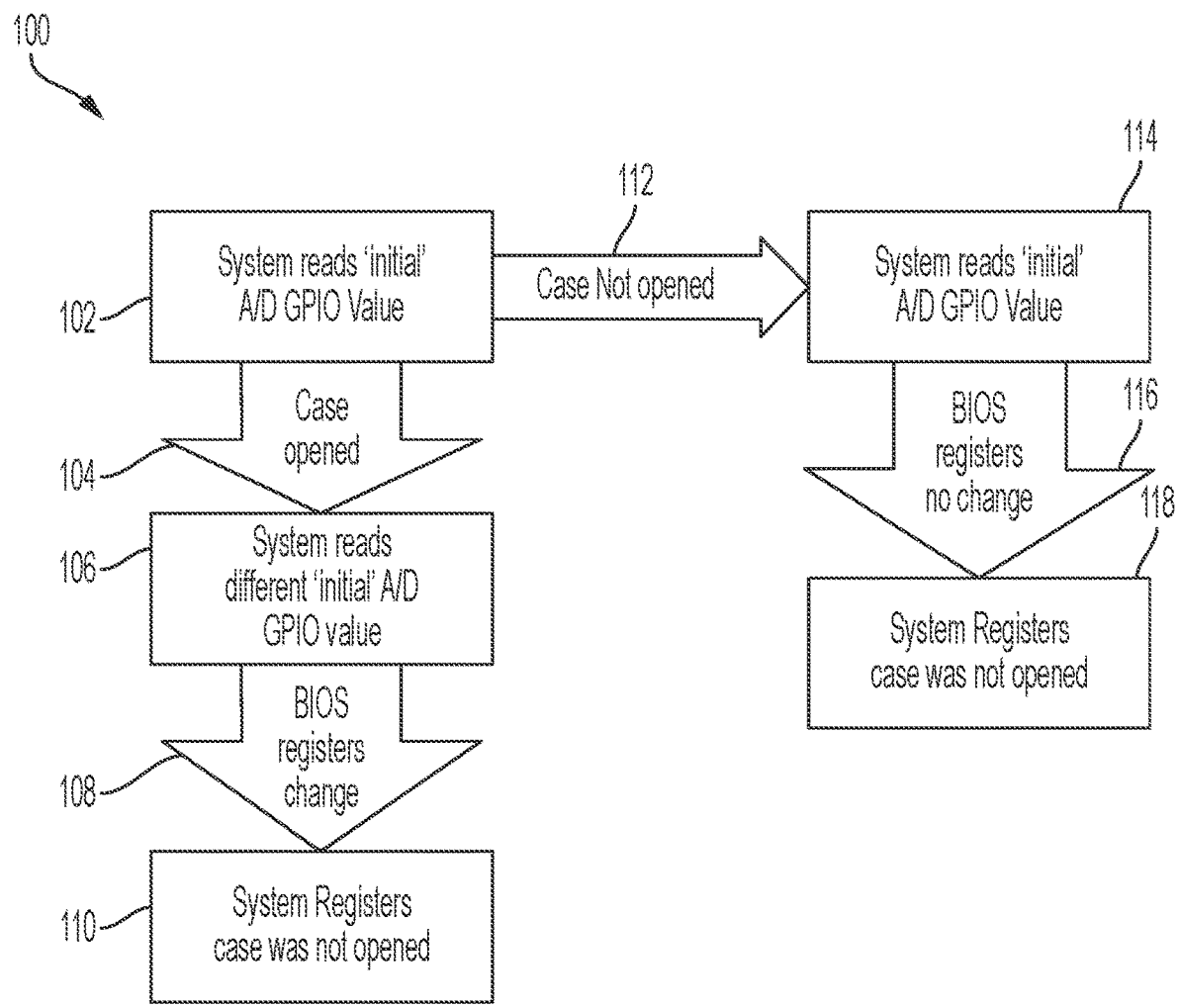
FIG. 1 is a flow chart of a method for determining if an intrusion occurred according to some embodiments of the disclosure.

The flow chart in FIG. 1 illustrates a flow chart of a method 100 according to some embodiments of the disclosure. Method 100 may start with the IHS determining an initial analog/digital GPIO value for a characteristic of a non-repeating element at step 102. When a user opens the secure boundary such as a cover of the IHS at step 104, the IHS may determine a different initial analog/digital GPIO value at step 106. For example, the IHS may determine a first value of the first characteristic of the non-repeating element and then retrieve another value of the same characteristic. The first value may be recorded after the recording of the second value and may be compared to a second value, a previous value. The IHS may then compare and register a difference between the first value and the second value at step 108. Based on the comparison, the IHS may determine that the secure boundary was opened or intruded upon at step 110. An event associated with the determination of block 110 may be executed based on reaching step 110. For example, the determination may be transmitted as an event to an operating system, recorded into RAM or scratchpad, logged in a BIOS event log, and/or stored in a non-volatile memory (NVM). As another example, certain functionality may be permanently or temporarily restricted in response to the intrusion detection. For example, access to certain memory components (e.g., a memory storing sensitive data or an encryption key) and/or certain processing components (e.g., a random number generator, an encryption/decryption circuit, a communications circuit, etc.). As a further example, the information handling system may transmit to a central IT system that the event occurred, through either or both of a primary or a secondary network connection through direct access (e.g., bypassing the operating system) or through a notification sent to the OS.

If the case was not opened as described in step 112, the IHS may read the initial analog/digital GPIO value from step 102 as an identical value or approximately equal (within a threshold amount) as a previous value at step 114. When the values do not differ, the IHS may register no change at step 116 and determine that there was no intrusion event at step 118. An event associated with the determination of block 110 may be executed on reaching step 118. For example, the determination may be transmitted as an event to an operating system, recorded into RAM or scratchpad, logged in a BIOS event log, and/or stored in a non-volatile memory (NVM).

Figure 2:
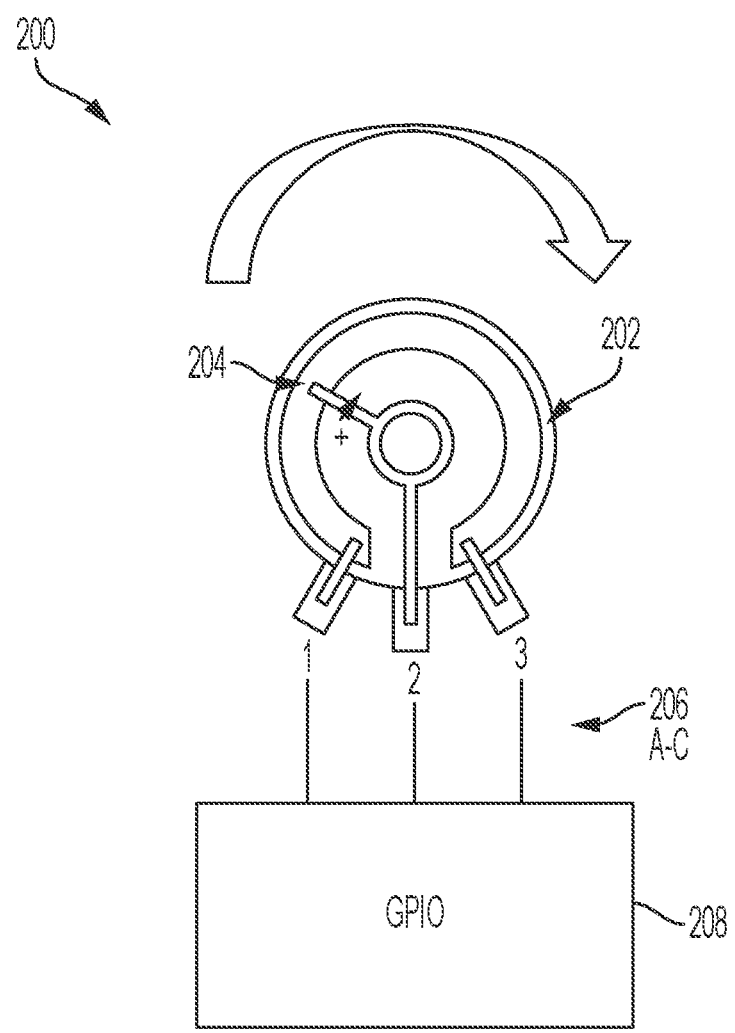
FIG. 2 is an illustration of an electro-mechanical switch as a non-repeating element according to some embodiments of the disclosure.

One example of a non-repeating element for which a characteristic value is determined as part of method 100 is shown in FIG. 2. FIG. 2 illustrates a variable resistance unit 200 of a non-repeating element 202 and a GPIO 208. The non-repeating element 200 may include a variable resistive element 202 that may include a resistive material such as a metallic material shaped as a semi-circle. The semi-circle resistive element 202 may provide a contact surface for a rotating wiper 204 to connect the resistance material. For example, the wiper 204 may contact the resistance material at various degrees of rotation as shown by the arrow in FIG. 2. The non-repeating element 200 with the wiper 204 may produce varying values such as a resistance value for the variable resistive element 202. For example, different values of a resistance characteristic for the unit 200 may be obtained as the wiper 204 rotates to different points on the resistance resistive element 202 between a pin 1 206A to a pin 3 206C. The wiper 204 that may be coupled to a pin 2 206B of the GPIO 208 and a characteristic value determined by measuring between pin 2 206B and one or more of pin 1 206A and pin 3 206C. The GPIO 208 may convert an analog value to a digital value based on the position of the wiper 204 in contact with the resistance element 202. The mechanical action of the wiper 204 may produce an electrical reading on the GPIO 208 with one or more pins that may be stored in non-volatile memory of the IHS for retrieval and analysis when the system is powered on. After the IHS determines the resistance value from the GPIO 208, an embedded controller, processor, or the like may compare the current resistance value with a previous resistance value similar to steps 108 and 116. In some embodiments, the GPIO 208 may have one or more pins for coupling with the non-repeating element 202.

In certain embodiments, the IHS may determine and retrieve one or more resistances values of a non-repeating element such as the variable resistive element 202. For example, the IHS may retrieve a voltage value as shown in the flow chart of FIG. 3 for method 300. Based on the mechanical rotation of a component such as the wiper 204 in contact with the non-repeating element 202, the method 300 may include one or more readings of from the GPIO 208. For example, the IHS may determine that an initial value of the non-repeating element may be 3.01V at step 302. The non-repeating element may be coupled to a secure boundary of the IHS being monitored to determine an intrusion event when a limit of the non-repeating element is activated. When the secure boundary such as a cover of the IHS is opened, the mechanical rotation of the component may change the resistance value of the non-repeating element at steps 304, 308, 312, and 316. For example, the IHS may determine that the current value of the non-repeating element may be 4.11V at step 306. In some embodiments, the IHS may determine the that difference between the current value and the previous value met the limit of the non-repeating element, and the IHS may indicate that the intrusion event occurred. In some cases, the intrusion detection system may detect one or more intrusions events. The IHS may determine the difference of the resistance values between steps 302, 306, 310, 314, 318, and/or 320. For example, the IHS may determine that the 4.91V at step 310 is the previous value when compared to the current value of 2.81V at step 318 and that the intrusion event occurred between these two example values. In another embodiment, the resistance value may continue to change after step 310 because the component such as the wiper 204 may rotate to the end of the resistance material at step 314. When the wiper 204 rotates pass the end of the resistance material at step 314, the resistance values may be reset at step 316. For example, the wiper 204 may rotate 360 degrees from the pin 1 206A and reset the resistance values.

Figure 4:
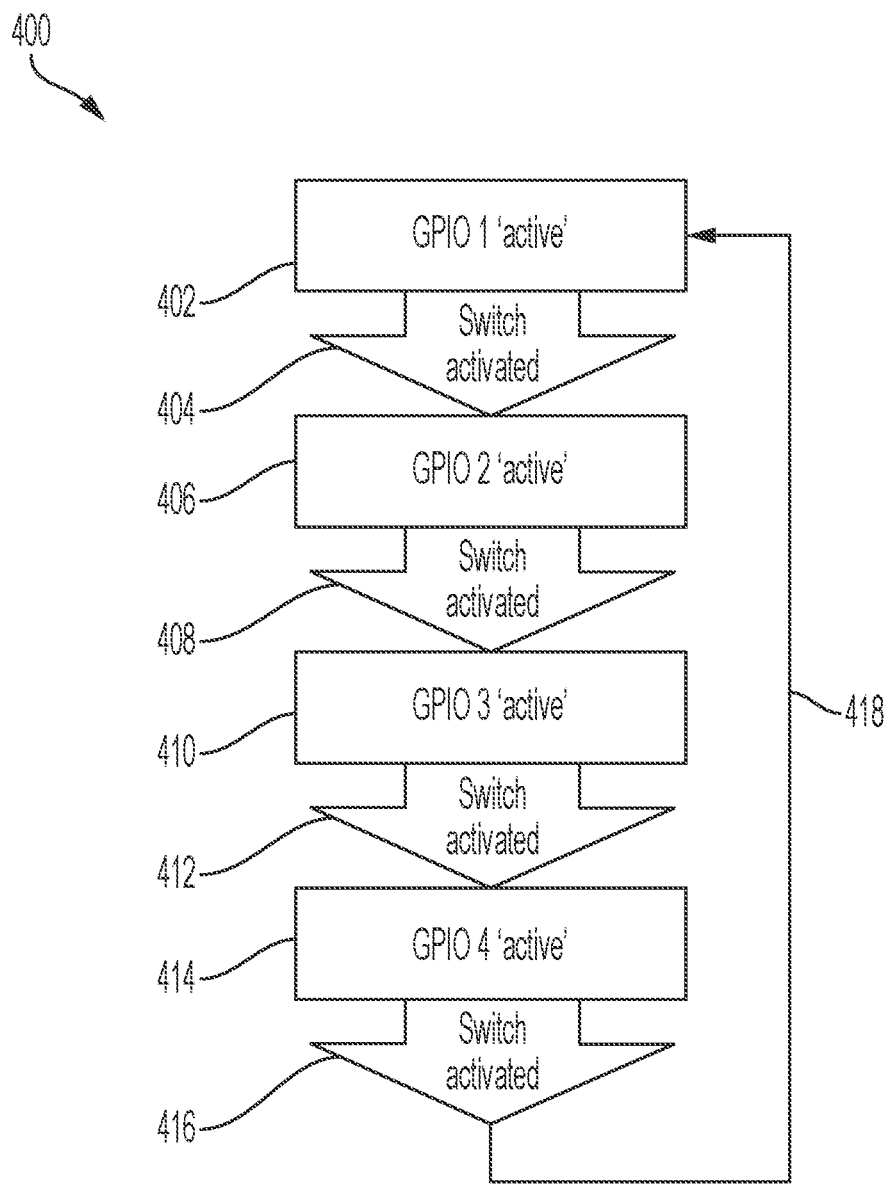
FIG. 4 is a flow chart illustrating an example method for determining a value of a non-repeating element according to some embodiments of the disclosure.

FIG. 4 illustrates an example of method 400 in a flow chart where the GPIO pins 1 through 4 may be activated. In some embodiments, the IHS may determine that a GPIO pin is activated in order to determine whether an intrusion event occurred. The GPIO may be coupled to active power through an active rail of the IHS and may be coupled to the non-repeating element for intrusion detection. In some embodiments, the GPIO may operate with no power because the GPIO pins may be activated without power. At step 402, the GPIO pin 1 may be activated and the IHS may store the initial status. When the non-repeating element produces a new value, the GPIO pin 2 may be activated at step 406 because of a switch activation at step 404. For example, the switch activation at step 404 may include the wiper 204 rotating from pin 1 206A to pin 3 206C. The IHS may store the current status and determine whether there is a difference between the statuses at steps 402 and 406. Based on the status differences between the two pins, the IHS may determine that the limit for the non-repeating element has been met and the intrusion event occurred. At steps 408, 412, and 416, the activation of the switch for the GPIO may be triggered and produce a different status at GPIO pin 3 at step 410 and GPIO pin 4 at step 414. In some embodiments, the IHS may read the one or more GPIO pin statuses to determine whether the intrusion event has occurred. In certain embodiments, the GPIO pin statues may be reset at step 418, and GPIO pin 4 may be compared with GPIO pin 2 depending on the switch activation and reset at step 418.

Figure 3:
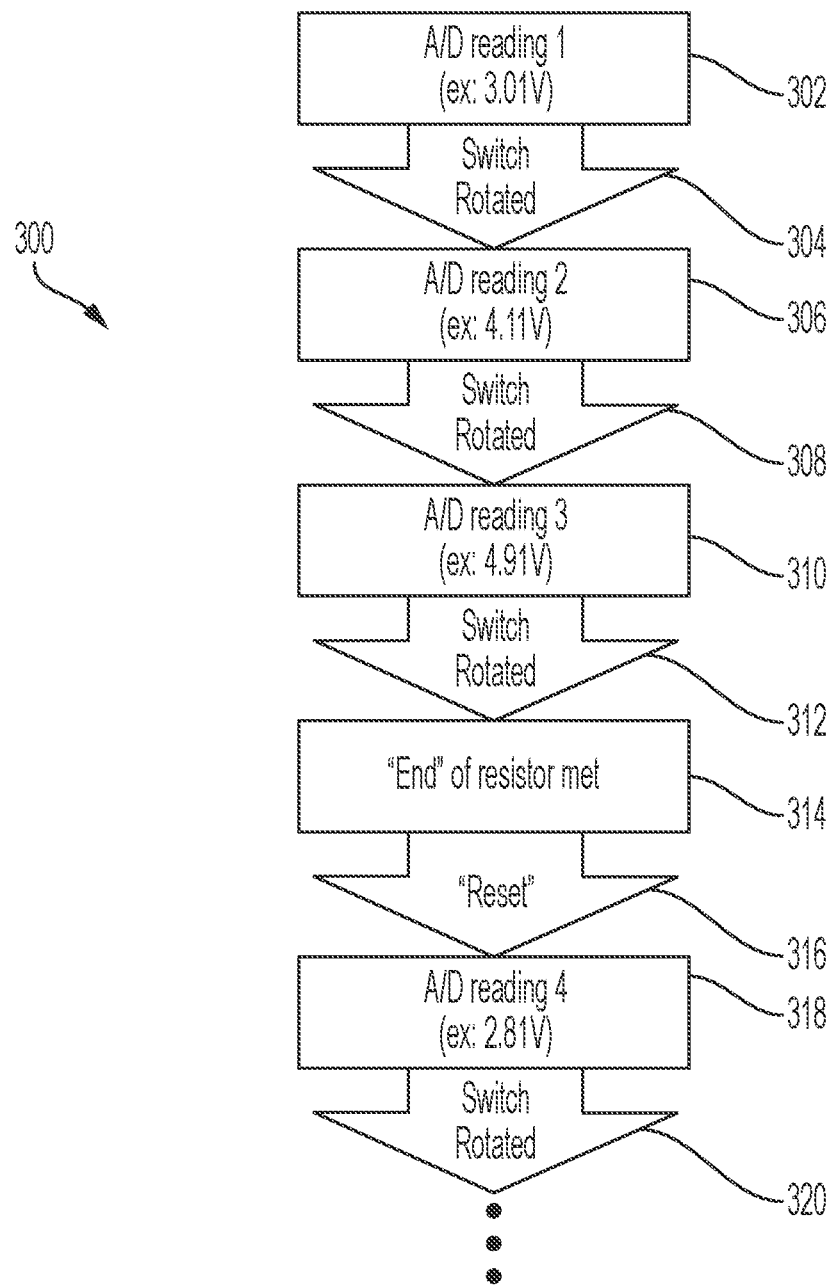
FIG. 3 is a flow chart illustrating an example method for determining a value of a non-repeating element according to some embodiments of the disclosure.

FIG. 3 and FIG. 4 are methods illustrating potential non-repeating values determined from a non-repeating element according to different embodiments. In FIG. 3, a method 300 of operation for determining values from a non-repeating element is shown for a rotating wiper according to some embodiments of the disclosure. A first determination at block 302 may produce a first value, such as 3.01 Volts, which corresponds to a first value of a resistance characteristic of the non-repeating element. At block 304, the non-repeating element is activated to rotate the rotating wiper, which selects a new value for the resistance characteristic. At block 306, a second determination may produce a second value, such as 4.11 Volts. At block 308, the non-repeating element is activated again. At block 310, a third determination may produce a third value, such as 4.91 Volts. At block 312, the non-repeating element is activated again. The end of the circular resistive element may be reached at block 314, and the rotating wiper is reset at block 316 at the beginning of the circular resistive element. At block 318, a fourth determination may produce a fourth value, such as 2.81 Volts. The process may continue as the side of the chassis is removed or other aspects of the secure boundary are breached. Each activation of the non-repeating element at blocks 304, 308, 312, 320 produces a new value of the characteristic (e.g., resistance) that is different from the previous value. That is, each subsequent value has a low probability of being the same value as the previous value.

In FIG. 4, a method of operation for determination values from another non-repeating element is shown according to some embodiments of the disclosure. For example, the non-repeating element may be a series of elements with a switch that rotates from each element to the next element when the non-repeating element is triggered. A method 400 of operation begins at block 402 with a first determination producing a first value, such an output of (1,1,1,0) from four GPIO pins. At block 404 the switch is activated, and at block 406 a second determination produces a second value, such as an output of (1,1,0,0) from the four GPIO pins. At block 408 the switch is activated, and at block 410 a third determination produces a third value, such as an output of (1,0,0,0) from the four GPIO pins. At block 412 the switch is activated, and at block 414 a fourth determination produces a fourth value, such as an output of (0,0,0,0) from the four GPIO pins. Each of the values may be progressed through, for example, by the switch blowing a subsequent fuse in a series of fuses or toggling a switch in a series of switches, in which the switches and/or fuses couple the GPIO pins in series between a first terminal and a second terminal (which are coupled to a positive power supply and a negative power supply when determining the value of the non-repeating element). The non-repeating element may be configured such that the values repeat every four activations, such that the method 400 returns 418 back to the first value at block 402. The non-repeating element may alternatively be configured such that the element does not return to the first value after progressing through the available value states. In one example embodiment of such a non-repeating element, the non-repeating element may have four output pins and a contact inside the non-repeating element upon activating will reconfigure to contact the next of the output pins of the sequence of pins to a supply voltage. A determination of a value for a characteristic (e.g., voltage) may be made by reading each of the output pins of the non-repeating element to determine which of the output pins is connected to a supply voltage.

Figure 5:
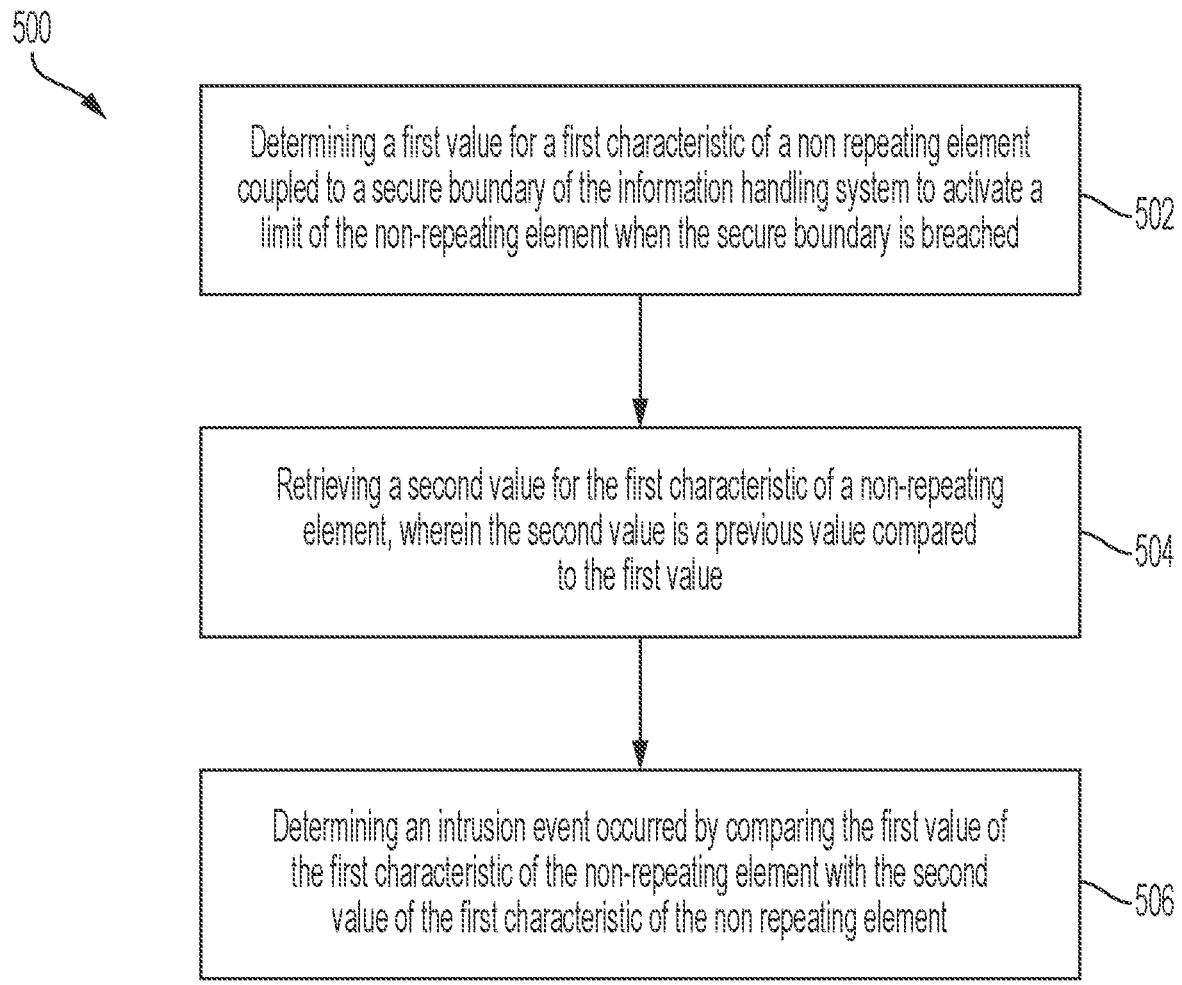
FIG. 5 is a flow chart illustrating a method for determining if an intrusion occurred according to some embodiments of the disclosure.

An embedded controller (EC), processor (CPU), or the like may determine and/or retrieve the non-repeating values from the non-repeating element, such as determined from GPIO terminals, and compare the non-repeating values for analysis to determine whether an intrusion event occurred. The method 500 as shown in FIG. 5 illustrates an example flow chart of the intrusion detection system according to some embodiments. In some embodiments, the IHS may include a non-repeating element with access through a GPIO. The IHS may further include a memory, and a processor coupled to memory, wherein the processor is configured to perform the method 500. At block 502, the IHS may determine a first value for a first characteristic of the non-repeating element. For example, the IHS may determine a voltage value corresponding to a resistance characteristic of a resistive element, a non-binary value corresponding to a non-binary characteristic of a non-binary element, and/or an activation status for a GPIO pin. The non-repeating element may be coupled to a secure boundary of the IHS such that the non-repeating element is triggered when the secure boundary is breached, such as by the removal of a side or panel of the IHS. The IHS may determine and/or retrieve a second value for the first characteristic of the non-repeating element at block 504. The second value may be a previous value compared to the first value. For example, the second value may be retrieved from a non-volatile memory (NVM) coupled to the processor. In certain embodiments, the IHS may determine the first value and second value by reading a current value from the GPIO coupled to the non-repeating element. At block 506, the IHS may determine whether an intrusion event occurred by comparing the first value of the first characteristic of the non-repeating element with the second value of the first characteristic of the non-repeating element. When comparing the values, the IHS may indicate that the secure boundary was breached based on one or more criteria, such as the first value being equal to the second value or the first value being within a threshold amount of the second value. For example, the IHS may determine that a cover of the IHS was removed after determining a difference between the initial value and the current value.

In some embodiments, the IHS may determine whether the intrusion event occurred when there is no power supplied to the non-repeating element. For example, the non-repeating element may be activated by a security breach without being powered by a battery. In another embodiment, the non-repeating element may be a non-binary element or a fuse. For example, the intrusion detection system may determine that the fuse has been blown. In certain embodiments, the BIOS may include code for performing the method 500 and the central processing unit (CPU) may execute the method 500 when executing the BIOS. In some embodiments, an intrusion may be detected even when the intrusion occurs while the IHS has no power. For example, the method 500 may be executed after the IHS is turned on after power was off at the IHS. With the second value stored in NVM, the previous value for the characteristic of the non-repeating element may be retained despite a power disconnection. With the non-repeating element comprising a mechanical component not reliant on power for measuring changes in the IHS, such as a force applied to the chassis, the non-repeating element may detect the intrusion despite a power disconnection. Upon powering on of the IHS after the power disconnection, the method 500 may be executed to determine if an intrusion was detected during the power disconnection. For example, the method 500 may include determining a position of the rotating wiper 204 relative to a variable resistive element 202, where the position of the rotating wiper 204 is rotated by an amount proportional to a force applied to a contact point of the secure boundary. The method 500 may further include determining the intrusion event for a cover or chassis of the IHS, where the cover or chassis is the secure boundary.

Figures 6A, 6B:
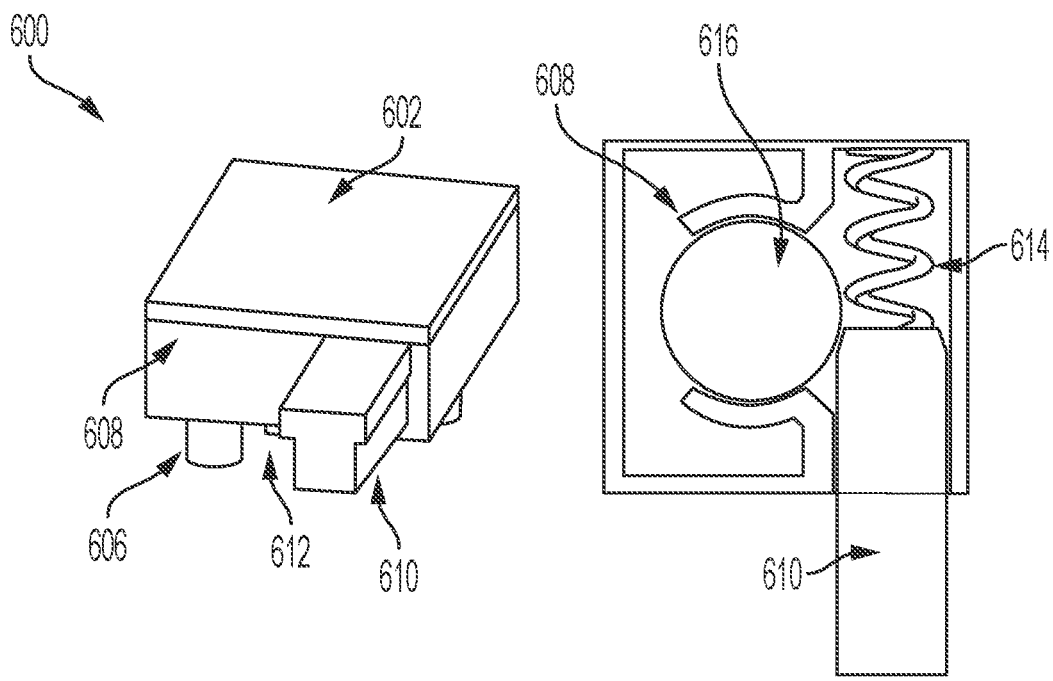
FIGS. 6A-6D are illustrations of an electro-mechanical switch according to some embodiments of the disclosure.

FIGS. 6A-6D illustrate an electro-mechanical switch 600 that may be implemented in the intrusion detection system of an IHS 620 according to some embodiments. For example, the electro-mechanical switch 600 may be attached to a motherboard (other printed circuit board or other component) of the IHS 620 and may include the variable resistance unit 200 from FIG. 2. As shown in FIG. 6A, the electro-mechanical switch 600 may include a housing 608, a cover 602, and a plunger 610. The housing 608 may have one or more alignment pin(s) 612 on the bottom surface for the switch 600 to electrically couple to the IHS 620. Additionally, the switch 600 may include a contact terminal 612 for a GPIO. FIG. 6B depicts the internal structure of the housing 608 that may include a rotating wiper 616, the plunger 610, and a spring 614. In some embodiments, the spring 614 may be supplemented with or replaced by another device that receives an applied force, such as a magnet arrangement with the same polar fields that can be pressed closer together by an external force. The distal end of the plunger 610 may be coupled to the proximal end of the spring 614, and the plunger 610 and the spring 614 may be located inside the housing 608. The plunger 610 may be mechanically coupled to the chassis of the IHS 620 such that removing a side or panel of the chassis of the IHS 620 or otherwise accessing a secure space of the IHS may activate the plunger 610 causing the rotating wiper 616 to move an amount proportional to a force applied to the plunger 610.

Figure 6C:
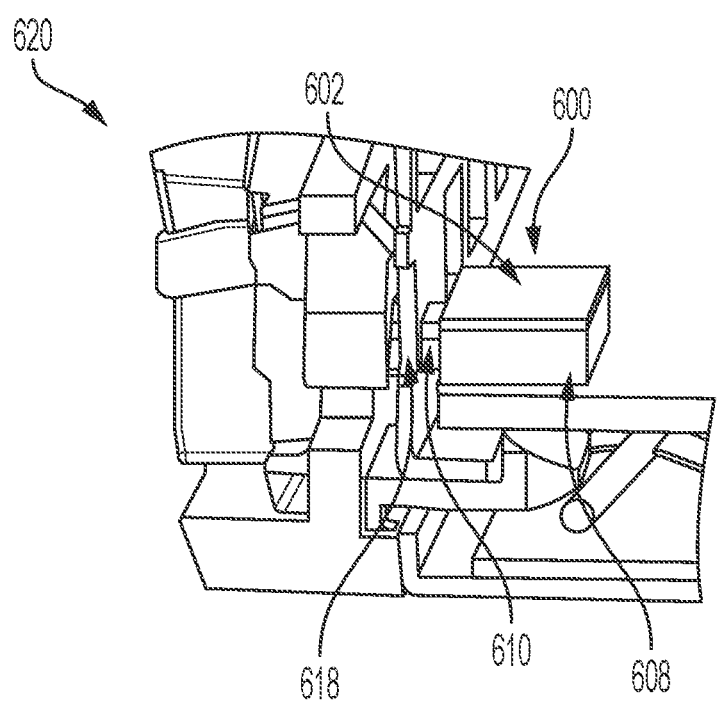

In FIG. 6C, the plunger 610 coupled to the spring 614 may be compressed into the housing 608 when the secure boundary is in place. For example, a cover 618 for the IHS may be the secure boundary of the IHS and may depress the plunger 610 partially into the housing 608. The alignment pin(s) 606 on the bottom of the switch 600 may be coupled to the IHS 620 to secure the switch 600 to the system. The alignment pin(s) 606 and the contact terminal 612 may extend away from the bottom of the housing 608. For example, the pin(s) 606 and the contact terminal 612 may protrude from the bottom of the housing 608. The cover 602 of the switch 600 seals the top of the housing 608 where the rotating wiper 616, the plunger 610, the spring 614, and the resistive element 622 may reside. The rotating wiper 616 may be configured to rotate in only one direction in response to movement of the plunger 610. In other embodiments, the rotating wiper 616 may be configured to rotate in either direction in response to movement of the plunger 610.

Figure 6D:
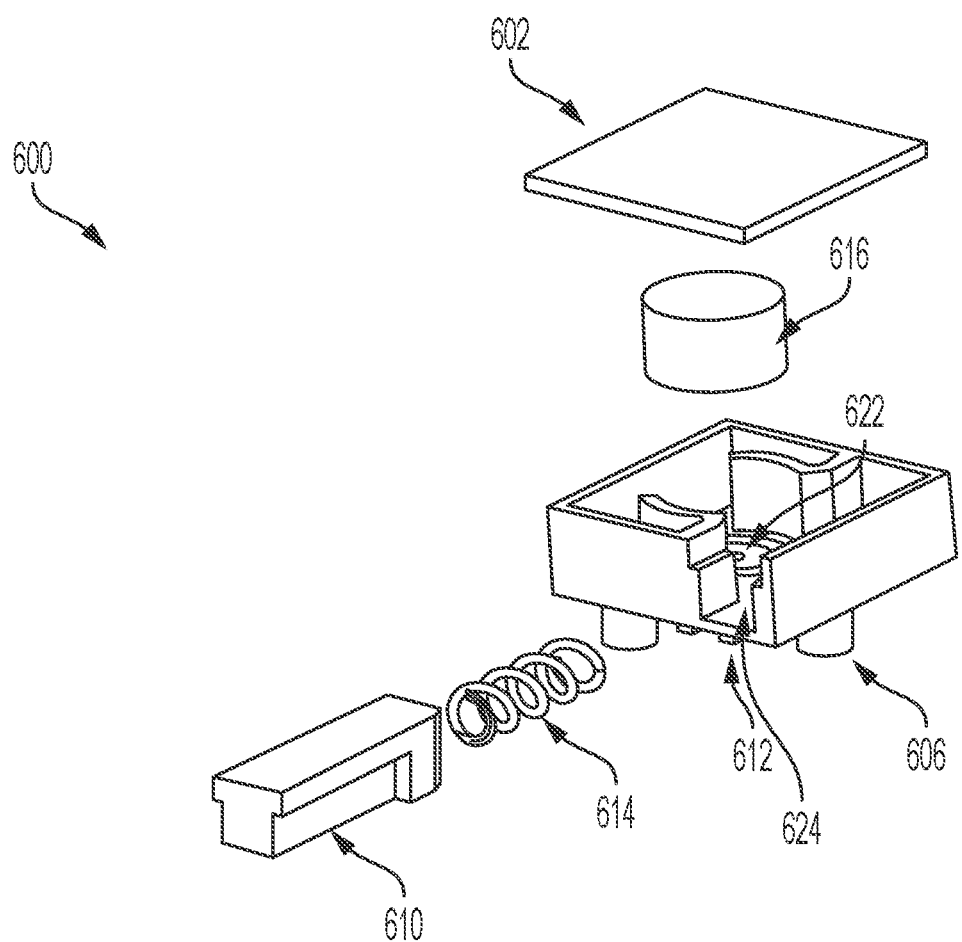

The housing 608 in FIG. 6D may have an opening 624 on one side, and the opening 624 may be configured to receive the plunger 610 and the spring 614 coupled together. The housing 608 may be configured to include the non-repeating element 622 that may be a variable resistive element as shown in FIG. 2. The rotating wiper 616 may be configured to cover a portion of the resistance element 622. The resistance element 622 may include a variable resistive element made of a conductive (e.g., metallic) material. In some embodiments, the resistance element 622 may be shaped as a semi-circle or another comparable shape for contact with rotating wiper 616. The bottom of the rotating wiper 616 may include a conductive (e.g., metal) contact for connecting the resistance material of the resistance element 622 to an input/output unit such as the GPIO.

The resistance element 622, the rotating wiper 616, and the spring 614 may be fully enclosed in the housing 608. The plunger 610 may be fully or partially enclosed in the housing 608 depending on the force applied to the plunger from the secure boundary 618. The plunger 610 coupled to the spring 614 may define a contact point for the secure boundary 618 with the switch 600 as shown in FIG. 6C. When the secure boundary 618 is removed, the plunger 610 may decompress and rotate the rotating wiper 616. For example, the rotating wiper 616 may be rotated by an amount proportional to a force applied to the plunger 610, the contact point of the secure boundary 618. As the movement of the plunger 610 rotates the rotating wiper 616, the position of the rotating wiper 616 relative to the resistance element 622 may be modified and may produce a new value for a characteristic of the resistance element 622. The IHS 620 may retrieve one or more values for the characteristic of the resistance element 622 from the GPIO and/or non-volatile memory. Then, the IHS may determine whether the current value is different from a previous value and may determine whether the difference between the two values exceeds a threshold amount. If so, the IHS 620 may determine that the cover 618 was removed and the intrusion event occurred.

In certain embodiments, the non-repeating element 622 with the GPIO may form the electro-mechanical switch 600. The GPIO may be coupled to active power through an active rail of the IHS 620 and may be coupled to the non-repeating element 622 for intrusion detection. In some embodiments, the non-repeating element 622 may be a comparable element that produces a measurable value based on one or more characteristics for comparison and detection of the intrusion event.

Figure 7:
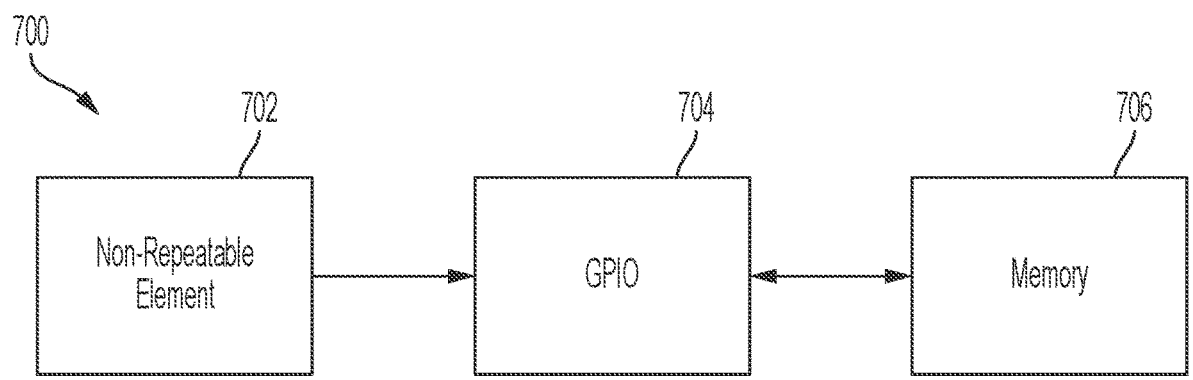
FIG. 7 is a block diagram of an intrusion detection system according to some embodiments of the disclosure.

FIG. 7 depicts a block diagram of an intrusion detection system 700 with a non-repeating element 702. The non-repeating element 702 may be coupled to a GPIO 704, and the GPIO 704 may be coupled to a memory 706 accessible by the IHS. The memory may include non-volatile memory or the like. The measured values may be non-repeating, but the values are recordable because the non-repeating element may be coupled to GPIO 704 in order to detect and monitor the values for determining the intrusion event. For example, the IHS may retrieve a value for a characteristic of the non-repeating element 702 and determine that the intrusion event occurred. Additionally, the IHS may display a notification on a user interface that indicates that the intrusion event has occurred after the IHS.

In some embodiments, the non-repeating element may include a variable resistance element as shown in FIG. 2 and FIG. 6D. In another embodiment, the non-repeating element may be a non-binary element where the values may be represented by values other than 0 and 1. In certain embodiments, the non-repeating element may include a fuse. For example, the intrusion detection system may determine that the fuse has been blown and that the limit of the non-repeating element has been met. In another embodiment, the non-repeating element may include a material that may be shaved away. For example, the IHS may measure the thickness of a material, and as the secure boundary is opened and closed, the thickness of the material may decrease. For some embodiments, the intrusion detection system may include a linear surface that could produce varying resistance values similar to FIG. 2.

Figure 8:
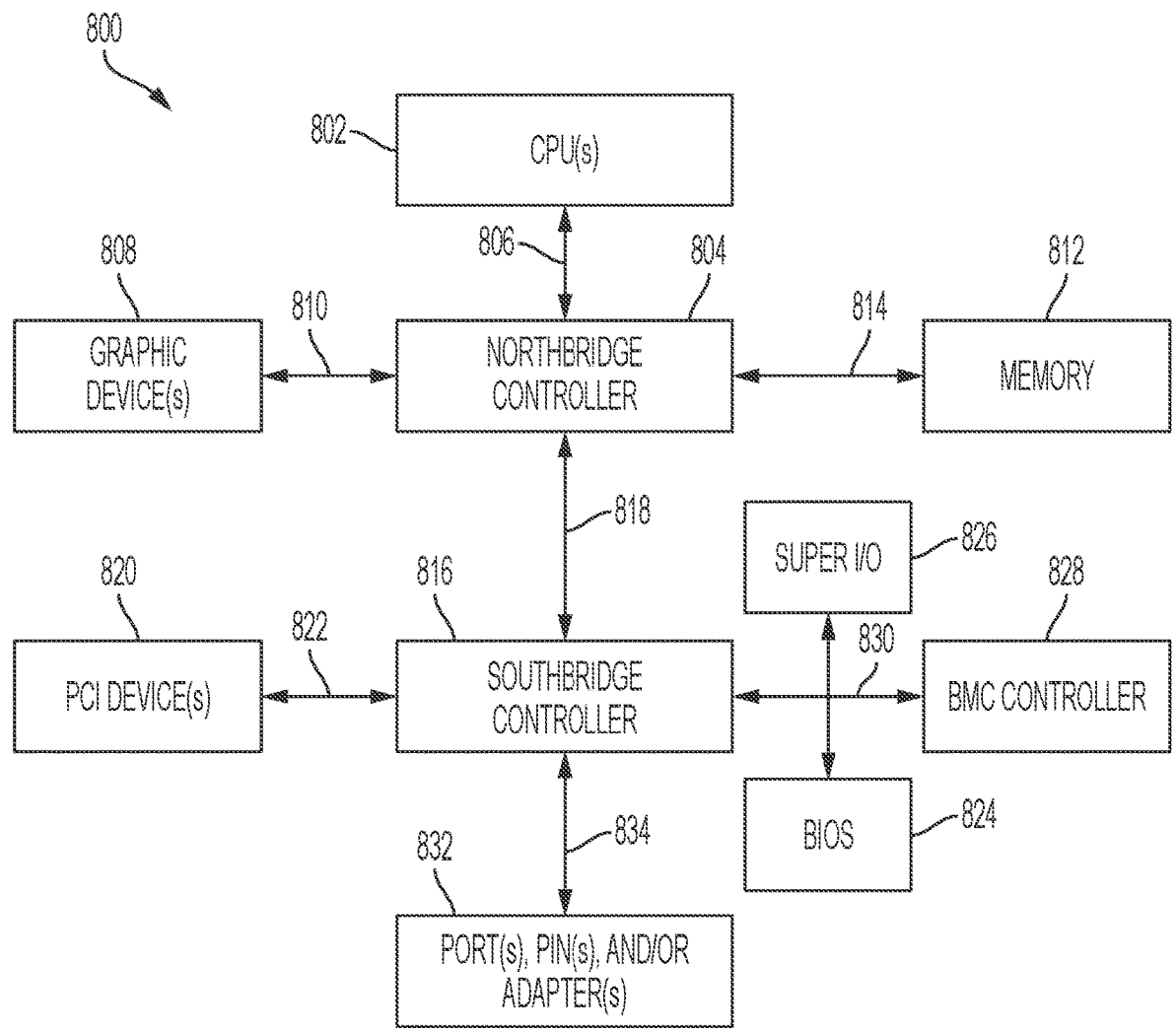
FIG. 8 is a schematic block diagram of an example information handling system according to some embodiments of the disclosure.

An information handling system (IHS) may include a variety of components to generate, process, display, manipulate, transmit, and receive information. Any of the illustrated components may be coupled to each other by a cable or another component. One example of an information handling system 800 is shown in FIG. 8. IHS 800 may include one or more central processing units (CPUs) 802. In some embodiments, IHS 800 may be a single-processor system with a single CPU 802, while in other embodiments IHS 800 may be a multi-processor system including two or more CPUs 802 (e.g., two, four, eight, or any other suitable number). CPU(s) 802 may include any processor capable of executing program instructions. For example, CPU(s) 802 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 802 may commonly, but not necessarily, implement the same ISA.

CPU(s) 802 may be coupled to northbridge controller or chipset 804 via front-side bus 806. The front-side bus 806 may include multiple data links arranged in a set or bus configuration. Northbridge controller 804 may be configured to coordinate I/O traffic between CPU(s) 802 and other components. For example, northbridge controller 804 may be coupled to graphics device(s) 808 (e.g., one or more video cards or adaptors, etc.) via graphics bus 810 (e.g., an Accelerated Graphics Port or AGP bus, a Peripheral Component Interconnect or PCI bus, etc.). Northbridge controller 804 may also be coupled to system memory 812 via memory bus 814. Memory 812 may be configured to store program instructions and/or data accessible by CPU(s) 802. In various embodiments, memory 812 may be implemented using any suitable memory technology, such as static RAM (SRAM), synchronous dynamic RAM (SDRAM), non-volatile/Flash-type memory, or any other type of memory.

Northbridge controller 804 may be coupled to southbridge controller or chipset 816 via internal bus 818. Generally, southbridge controller 816 may be configured to handle various of IHS 800's I/O operations, and it may provide interfaces such as, for instance, Universal Serial Bus (USB), audio, serial, parallel, Ethernet, etc., via port(s), pin(s), and/or adapter(s) 832 over bus 834. For example, southbridge controller 816 may be configured to allow data to be exchanged between IHS 800 and other devices, such as other IHSs attached to a network. In various embodiments, southbridge controller 816 may support communication via wired or wireless general data networks, such as any suitable type of Ethernet network, for example: via telecommunications/telephony networks such as analog voice networks or digital fiber communications networks; via storage area networks such as Fiber Channel SANs; or via any other suitable type of network and/or protocol.

Southbridge controller 816 may also enable connection to one or more keyboards, keypads, touch screens, scanning devices, voice or optical recognition devices, or any other devices suitable for entering or retrieving data. Multiple I/O devices may be present in IHS 800. In some embodiments, I/O devices may be separate from IHS 800 and may interact with IHS 800 through a wired or wireless connection. As shown, southbridge controller 816 may be further coupled to one or more PCI devices 820 (e.g., modems, network cards, sound cards, video cards, etc.) via PCI bus 822. The PCI devices 820 may couple to other information handling systems (such as through network cabling) and electronic devices (such as through audio cabling), in which the coupling is through wires according to embodiments of this disclosure. Southbridge controller 816 may also be coupled to Basic I/O System (BIOS) 824, Super I/O Controller 826, and Baseboard Management Controller (BMC) 828 via Low Pin Count (LPC) bus 830.

BIOS 824 may include non-volatile memory having program instructions stored thereon. The instructions stored on the BIOS 824 may be usable by CPU(s) 802 to initialize and test other hardware components and/or to load an Operating System (OS) onto IHS 800. For example, BIOS 824 may also refer to a set of instructions, stored on BIOS 824, that are executed by CPU(s) 802. As such, BIOS 824 may include a firmware interface that allows CPU(s) 802 to load and execute certain firmware, as described in more detail below. In some cases, such firmware may include program code that is compatible with the Unified Extensible Firmware Interface (UEFI) specification, although other types of firmware may be used.

BMC controller 828 may include non-volatile memory having program instructions stored thereon that are usable by CPU(s) 802 to enable remote management of IHS 800. For example, BMC controller 828 may enable a user to discover, configure, and manage BMC controller 828, setup configuration options, resolve and administer hardware or software problems, etc. Additionally or alternatively, BMC controller 828 may include one or more firmware volumes, each volume having one or more firmware files used by the BIOS' firmware interface to initialize and test components of IHS 800.

In some embodiments, IHS 800 may be configured to access different types of computer-accessible media separate from memory 812. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 800 via northbridge controller 804 and/or southbridge controller 816. Super I/O Controller 826 combines interfaces for a variety of lower bandwidth or low data rate devices. Those devices may include, for example, floppy disks, parallel ports, keyboard and mouse, temperature sensor and fan speed monitoring, etc.

In some embodiments, northbridge controller 804 may be combined with southbridge controller 816, and/or be at least partially incorporated into CPU(s) 802. In other implementations, one or more of the devices or components shown in FIG. 8 may be absent, or one or more other components may be added. Accordingly, systems and methods described herein may be implemented or executed with other computer system configurations. In some cases, various elements shown in FIG. 8 may be mounted on a motherboard, coupled to a PCB, paddleboard or other connector, or protected by a chassis or the like.

The flow chart and sequence flow diagrams of FIG. 1, FIG. 3, FIG. 4, and FIG. 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in an information handling system. For example, an information handling system may include an intrusion detection system. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although the intrusion detection system may include non-repeating element. Other kinds or types of non-repeating elements and/or accompanying components may be used in the invention depending on applications and operations performed. As another example, although processing of certain kinds of values or attributes may be described in example embodiments, other kinds of values or attributes may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
   determining, by an information handling system, a first value for a first characteristic of a non-repeating element coupled to a secure boundary of the information handling system such that the non-repeating element is cycled to a new non-repeating value when the secure boundary is breached;
   determining, by the information handling system, a second value for the first characteristic of the non-repeating element, wherein the second value corresponds to a previous time than the first value; and
   determining, by the information handling system, an intrusion event occurred by comparing the first value of the first characteristic of the non-repeating element with the second value of the first characteristic of the non-repeating element.

2. The method of claim 1, wherein determining the first value of the first characteristic of the non-repeating element comprises determining the first value of the first characteristics of an electro-mechanical switch.

3. The method of claim 2, wherein determining the first value of the first characteristic of the electro-mechanical switch comprises determining a position of a rotating wiper relative to a variable resistance element, wherein the position of the rotating wiper is rotated by an amount proportional to a force applied to a contact point of the secure boundary.

4. The method of claim 1, wherein determining the first value of the first characteristic of the non-repeating element comprises determining the first value of the first characteristics of a non-binary element.

5. The method of claim 1, wherein determining the first value of the first characteristic of the non-repeating element comprises reading a current value from a general purpose input/output port of the non-repeating element.

6. The method of claim 1, wherein determining the intrusion event occurred by comparing the first value of the first characteristic of the non-repeating element with the second value of the first characteristic of the non-repeating element indicating that the limit was activated comprises determining the intrusion event occurred when there is no power supplied to the non-repeating element.

7. The method of claim 1, further comprising, based on determining the intrusion event occurred, generating a security log entry indicating the intrusion event.

8. The method of claim 1, wherein the step of determining the first value and determining the second value are performed by a basic input/output system (BIOS).

9. An information handling system comprising:
   a chassis comprising at least one removable component forming a secure boundary;
   a non-repeating element configured to cycle to a new non-repeating value of a first characteristic when the secure boundary is breached;
   a memory within the chassis; and
   a processor within the chassis and coupled to the memory, wherein the processor is configured to perform the steps comprising:
      determining, by the information handling system, a first value for the first characteristic of the non-repeating element;
      retrieving, by the information handling system, a second value for the first characteristic of the non-repeating element, wherein the second value corresponds to a previous time than the first value; and determining, by the information handling system, an intrusion event occurred by comparing the first value of the first characteristic of the non-repeating element with the second value of the first characteristic of the non-repeating element.

10. The information handling system of claim 9, wherein determining the first value of the first characteristic of the non-repeating element comprises determining the first value of the first characteristics of an electro-mechanical switch.

11. The information handling system of claim 10, wherein determining the first value of the first characteristic of the electro-mechanical switch comprises determining a position of a rotating wiper relative to a variable resistive element, wherein the position of the rotating wiper is rotated by an amount proportional to a force applied to a contact point of the secure boundary.

12. The information handling system of claim 11, wherein the electro-mechanical switch further comprises a housing, a contact terminal for a general purpose input/output, a spring, a plunger, and a cover, wherein the plunger comprises the contact point for the secure boundary and the cover comprises the secure boundary.

13. The information handling system of claim 9, wherein determining the first value of the first characteristic of the non-repeating element comprises determining the first value of the first characteristics of a non-binary element.

14. The information handling system of claim 9, wherein determining the first value of the first characteristic of the non-repeating element comprises reading a current value from the general purpose input/output port of the non-repeating element.

15. The information handling system of claim 9, wherein determining the intrusion event occurred by comparing the first value of the first characteristic of the non-repeating element with the second value of the first characteristic of the non-repeating element indicating that the limit was activated comprises determining the intrusion event occurred when there is no power supplied to the non-repeating element.

16. The information handling system of claim 9, wherein the processor is further configured to based on determining the intrusion event occurred, restrict functionality of the information handling system.

17. The information handling system of claim 9, wherein the step of determining the first value and determining the second value are performed by the processor during execution of a basic input/output system (BIOS).

\* \* \* \* \*